United States Patent [19]

Kovaleski

[11] 4,441,692
[45] Apr. 10, 1984

[54] RUBBER-LAGGED SHEAVE

[75] Inventor: Joseph J. Kovaleski, Easton, Conn.

[73] Assignee: Wyrepak Industries, Inc., Bridgeport, Conn.

[21] Appl. No.: 373,325

[22] Filed: Apr. 30, 1982

[51] Int. Cl.³ .................. B66D 1/36; B66D 1/00; F16H 55/48

[52] U.S. Cl. .................. 254/390; 254/417; 254/402; 474/178

[58] Field of Search .............. 254/390, 371, 416, 902; 474/177, 178; 308/191; 277/171, 97, 205, 166, 167.5, 186

[56] References Cited

U.S. PATENT DOCUMENTS

| | | | |
|---|---|---|---|
| 622,214 | 4/1899 | Fletcher | 474/177 X |
| 1,179,238 | 4/1916 | Swain | 474/177 X |
| 2,655,813 | 10/1953 | Howell | 474/177 X |
| 3,010,700 | 11/1961 | Peterson | 254/902 X |
| 3,434,727 | 3/1969 | Kollenberger | 277/167.5 X |
| 3,494,212 | 2/1970 | Thomson | 474/177 X |
| 3,892,644 | 6/1959 | Collins | 277/171 |
| 4,294,491 | 10/1981 | Black | 308/191 X |

Primary Examiner—Stuart S. Levy
Assistant Examiner—Thomas R. Hannon
Attorney, Agent, or Firm—H. Gibner Lehmann; K. Gibner Lehmann

[57] ABSTRACT

A pulley or sheave that is lagged with rubber or rubber-like material, has two disc-like members which are disposed broadside to each other and secured together to form an annular groove for receiving and guiding a strand of material. At their centers, the members have bearing means to accommodate a spindle. In the annular groove for the strand of material the members have oppositely disposed wall portions characterized by reentrant side walls. A wear strip of relatively soft, resilient material such as rubber having an elongated rib occupies the annular groove, the rib being accommodated in and frictionally seized by the reentrant side walls. The wear strip has abutted ends, and presents an annular exterior space for engagement with the strand of material that is being handled.

20 Claims, 8 Drawing Figures

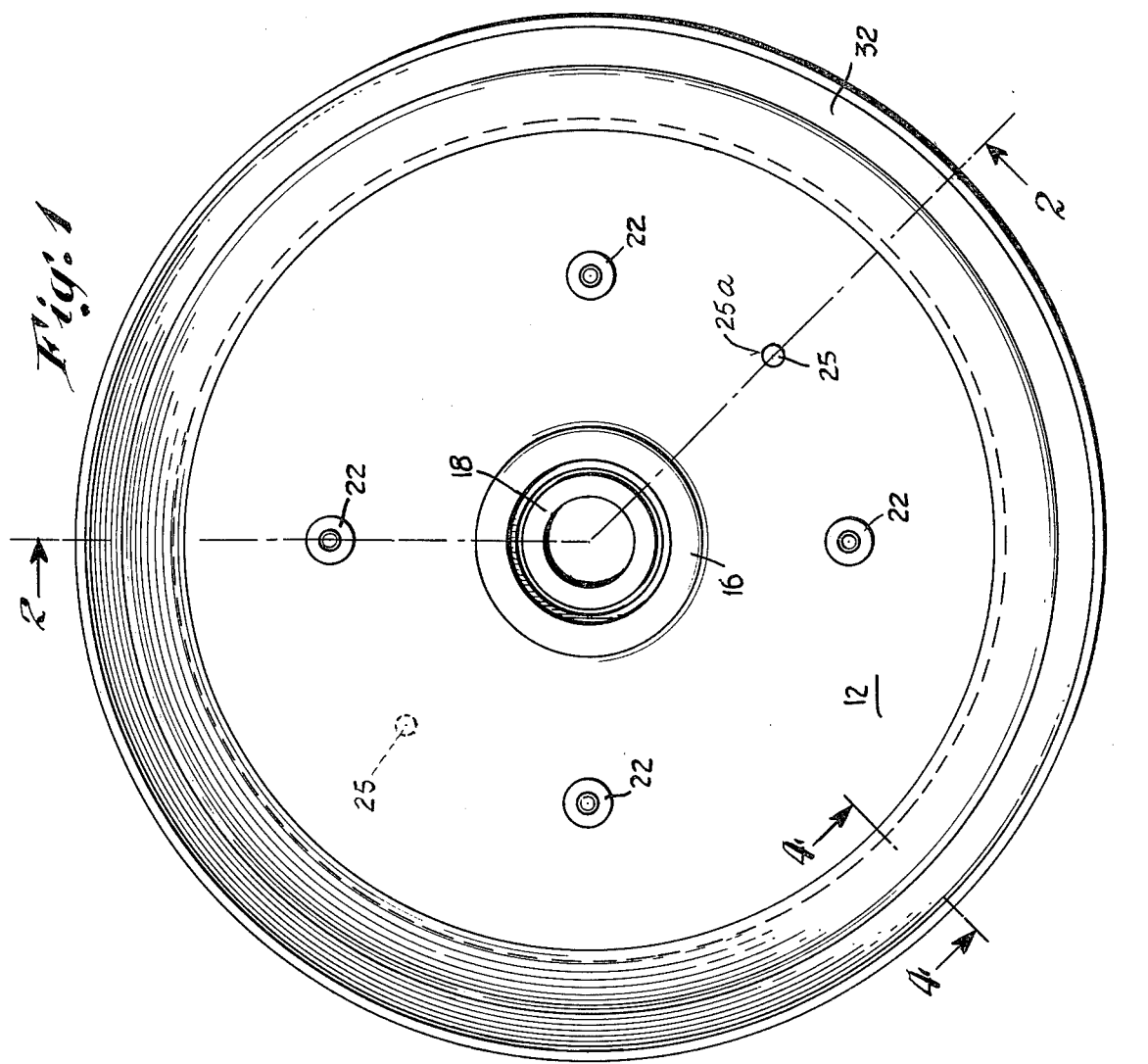
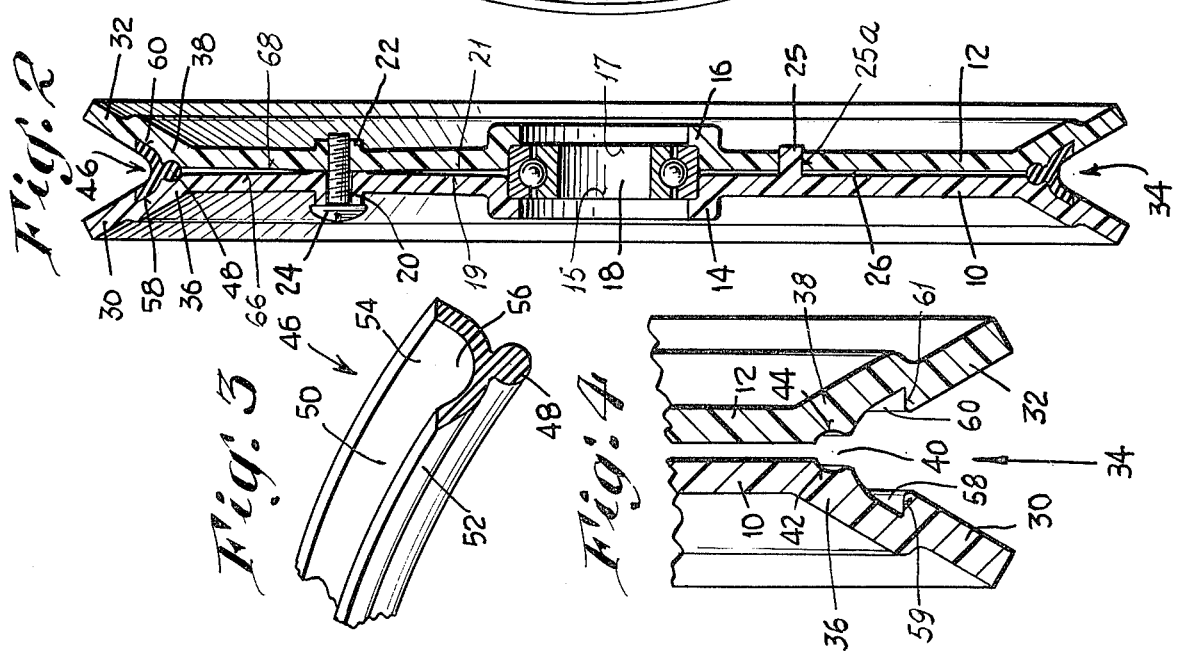

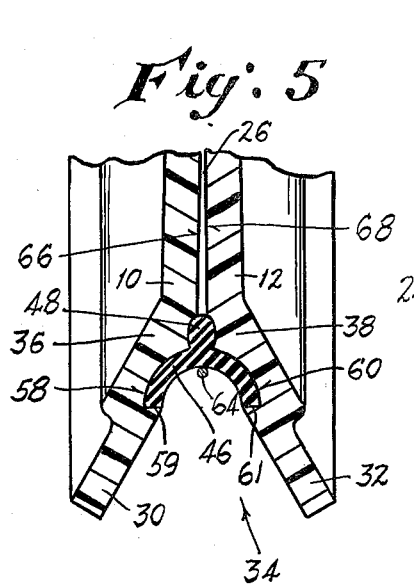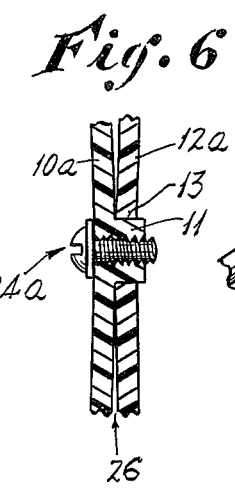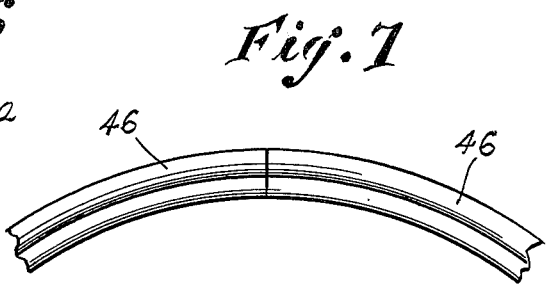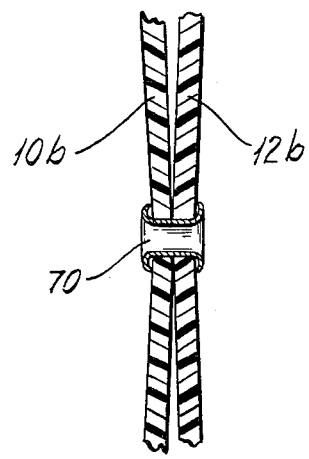

RUBBER-LAGGED SHEAVE

BACKGROUND

This invention relates generally to pulleys or sheaves which are lagged, that is, provided with special wear-resistant or friction surfaces, and more particularly to multi-part sheaves of the type having facings in their grooves, adapted for engagement by the strand material which is being handled.

In the past there have been many proposals and constructions for minimizing the friction and wear on pulleys and sheaves, as by providing metal or rubber, or rubber-like facings which are adapted for enagement with the belt or strand material passing over the pulley or sheave.

In the case of pulleys or rollers where the wear-resistant or other facings comprised metal overlays, or plates or lag strips which were attached to the pulley surfaces by suitable fastenings, when the wear strips or facings become worn or no longer useful, they were merely replaced by new strips or facings, thus saving the cost of discarding the entire pulley or sheave, as well as the expense represented by down time, labor, etc.

It has been common practice, in the handling of strand material which could cause excessive wear, to employ hardened facings, platings or inlays of wear-resilient metal, as for example chromium, carbide, etc. Surprisingly, these hardened facings would also ultimately show appreciable wear even with soft strand material, for the reason that the strand material was always presenting a new surface, and the amount of wear on any given section of the strand was infinitesimal. Moreover, the presence of dirt, grit and the like on the strands acted as an abrasive that was quite effective against hard metals.

Additionally, the use of particualarly hard metal inserts always represented an appreciable cost, since the special alloys, sintering and other processes etc. were not especially economical.

Often the replacement of wear-resistant surfaces of metal and the like on a pulley or sheave required the services of a skilled mechanic, and even though special provision was made for quick removal there was still involved a certain amount of down time of the equipment.

Where the pulleys or sheaves were disposed in somewhat inaccessible locations, the dismantling of portions of the equipment was sometimes necessary in order to reach the worn component and effect the replacement. Moreover, in the case where the worn component was in a cramped space, the replacement did not always proceed as quickly as could be desired.

SUMMARY

The above disadvantages and drawbacks of prior lagged or faced pulleys and sheaves are obviated by the present invention, which has for one object the provision of an improved sheave with wear resistant facings, which is especially economical to fabricate, representing a low initial cost and also a low cost for replacement of the wear-resistant element.

Another object of the invention is to provide an improved sheave with wear-resistant facing as above characterized, which is especially resistant to a surprising extent, to wear and abrasion when handling strand materials such as wire and the like, that are constituted of metal.

Yet another object of the invention is to provide an improved sheave with replaceable wear-resistant facing in accordance with the foregoing, which especially lends itself to easy and quick replacement of the facing element.

Still another object of the invention is to provide an improved sheave with replaceable wear resistant element as above set forth, wherein the replacement of the element can be easily and quickly effected without requiring special tools and often without equipment other than, for example, a scissors or knife blade.

A further object of the invention is to provide an improved multi-part sheave as characterized, having a replaceable, resilient rubber or rubber-like facing element which is securely retained in its operative position at all times yet may be easily removed and replaced without requiring dismantling of the sheave components.

A feature of the invention resides in the provision of a novel and improved multi-part sheave with replaceable wear elements in accordance with the above, which is effective and reliable in its operation and also especially silent when handling various types of strand materials, constituted of either metal or other substances.

In accomplishing the above objects the invention provides a novel sheave comprising a disc-like member which has means at its center to accommodate a bearing by which the member can be rotatably mounted on a spindle. The disc-like member has an annular peripheral portion which is laterally offset axially of the axis of the member, and the sheave further comprises a cooperable annular member which has a peripheral offset portion that is complementary to the offset portion of the disc-like member. Both members may advantageously be disc-like and constituted to be essentially identical to each other.

Means are provided for securing the members together in broadside relation whereby the offset peripheral portions thereof form an annular groove for receiving and guiding a strand of material such as a round belt, wire, etc. The members have oppositely-disposed wall portions adjacent their peripheral portions, which together form an annular recess with re-entrant side walls. For disposition in said recess there is provided an elongate rib of a wear strip constituted of relatively soft, resilient material such as rubber, flexible plastic and the like. The elongate rib is frictionally seized by the re-entrant sidewalls of the annular recess, and the wear strip extends along the recess and presents an annular exterior space for engagement with the strand of material which is being handled by the sheave.

The components of the sheave can be advantageously constituted of molded plastic substance, thereby to reduce finishing costs, eliminate rusting, corrosion and the like and provide for lightness in weight and low inertia.

Other features and advantages will hereinafter appear.

In the accompanying drawings:

FIG. 1 is a side elevational view of the improved multi-part sheave with soft frictional wear strip as provided by the invention.

FIG. 2 is a diametric section taken on the line 2—2 of FIG. 1.

FIG. 3 is a fragmentary perspective view, somewhat enlarged, of the flexible wear strip of the sheave shown in FIGS. 1 and 2.

FIG. 4 is a fragmentary section, enlarged, taken on the line 4—4 of FIG. 1 but with the wear strip removed.

FIG. 5 is a view like FIG. 4, enlarged, showing the wear strip installed, and illustrating a strand-engaging the strip.

FIG. 6 is a fragmentary section showing a modified fastening construction for the parts of the sheave.

FIG. 7 is an elevational view of the wear strip per se, showing its opposite ends in abutting relation, and FIG. 8 is a fragmentary sectional view like that of FIG. 6 but showing another form of fastening means adaptable to the sheave construction.

As shown, the improved multi-part, lagged sheave construction of the present invention comprises a pair of disc-like members 10, 12 having offset, annular center portions 14, 16 which provide a circular hub to receive an anti-friction ball bearing assemblage 18 when the members are disposed broadside to each other. The bearing assemblage 18 is seated between two annular shoulders 15, 17 as shown.

The members 10, 12 can be advantageously molded of a plastic substance such as polypropylene or the like. This makes for lightness in weight, and eliminates the necessity for finishing operations such as plating, etc. while at the same time enabling the disc to be resistant to corrosive atmospheres or influences.

The members 10, 12 can be provided with a plurality of molded hollow bosses 20, 22 respectively. The bosses 22 can be threaded to receive screws 24, and the bosses 20 reamed to provide clearance for the screws. By tightening the screws 24 threaded into the bosses 22 the members can be sprung slightly as they are pulled tightly together. The bearing assemblage 18 comprises outer and inner races, with the outer race being held between the shoulders 15, 17. The surfaces 19, 21 of the members 10, 12 adjacent the bearing assemblage 18 are maintained in spaced apart relation by the outer race, and when the screws 24 are tightened, there is effected a bowing inward of the members such that the assemblage 18 is tightly clamped in its intended position.

In other words, the dimensions of the disc-like members 10, 12 are such that normally a small space, indicated at 26, exists between the members; this is effected by the axial length of the bearing assemblage 18.

Initial positioning of the members 10, 12 can be effected by single pins or studs 25 molded thereon, which fit into corresponding apertures or holes, one in each member, as seen in FIGS. 1 and 2.

The disc-like members 10, 12 have annular peripheral portions 30, 32 respectively, which are laterally offset axially of the axis of the members and disposed angularly so as to form between them a V-groove 34.

Also, in accordance with the present invention, the members 10, 12 have oppositely-disposed wall portions 36, 38 adjacent the peripheral portions 30, 32, which portions 36, 38 form an annular recess 40 characterized by re-entrant side walls 42, 44. According to the present invention, there is provided for disposition in the V-groove 34 and the retainer recess 40 a wear strip 46 of relatively soft, resilient material such as rubber, rubber-like substance or resilient plastic, such wear strip having an elongate rib 48 having re-entrant side walls, which is accommodated in and seized by the re-entrant sidewalls forming annular retention grooves 42, 44 facing each other. The wear strip 46 has a facing portion 50 of generally curvilinear section comprising sidewalls 52, 54 which present an annular exterior space 56 for engagement with a wire or strand of material which is being placed around or handled by the sheave. The rib 48 is on the convex side of the wear strip.

The sheave members 10, 12 also have undercuts 58, 60 with retainer shoulders 59, 61 adapted to receive the walls 52, 54 respectively of the wear strip 46 whereby the V-groove 34 presents essentially a smooth, flush surface and the shoulders 59, 61 help to lock the wear strip in place against the action of centrifugal force.

With the above construction it can now be understood that the resilient wear strip 46 can be applied to the peripheral portions of the sheave after the disc-like members thereof have been assembled to the bearing assembly 81 and to each other. The rubber bead or rib 48 can be readily placed into the recess 40 whereupon the side walls 52, 54 will be accommodated in the undercuts 58, 60 of the sheave members 10, 12.

The wear strip 50 is first cut to the proper length whereby the two ends thereof will either abut each other as seen in FIG. 7 or else be closely juxtaposed. I have found that with such construction the resilient wear strip 46 is securely retained by the rib 48 and shoulders 59, 61 of the V-groove against the action of centrifugal force that might be exerted on it even at extremely rapid or very high rotative speeds of the sheave, and also that the soft, resilient nature of the wear strip is advantageous in resisting abrasion and wear when the sheave is handling metal strand material such as the wire strand 64 and the like.

Moreover at such time that the wear strip 46 becomes worn through, it can be very easily and quickly removed and replaced by a new wear strip that is cut from a supply of strip stock. The old wear strip is merely pulled out of the groove 34 and the new wear strip forced into the groove, to replace the old. This can be done very readily, and usually without requiring special tools except perhaps a scissors or a knife to cut the new wear strip to the required length. Such length can be obtained by using the old removed wear strip as a gauge, for example.

Again referring to FIG. 2, it can be seen that as the screws 24 are pulled up, there occurs an inward bowing of the members 10, 12. The surfaces 66, 68 of these members in the vicinity of the rib 48 are maintained spaced apart by the rib, but upon tightening these screws, the rib, which is normally generally circular in cross section when it is molded or fabricated, is deformed or flattened into an egg shape, by the pinching action of the walls 36 and 38. Such deformation is particularly illustrated in FIG. 5. FIG. 5 also shows the strand 64 of wire material in section, as it would appear occupying part of the space 56 defined by the concave surface of the wear strip.

An alternate form of securement of the members is illustrated in FIG. 6, in which one of the members 10a is provided with a hollow boss 11, and an aperture 13 and the other member 12a receives the boss when the members are assembled. Upon installation of a self tapping screw 24a, the walls of the boss 11 are spread into firm engagement with the walls of the aperture 13. As can be readily understood, other forms of securing the two parts 10 or 10a and 12 or 12a together could be substituted for the two methods shown. For example, Tinnerman type fasteners could be easily employed, or other readily available means.

One such other type of available means is illustrated in FIG. 8, wherein the members 10b and 12b of the sheave are merely provided with simple aligned holes that receive eyelets 70. In this case the members 10b and 12b can be molded indentically and will not require any later qualifying operations. The members 10b and 12b are provided with aligning studs and cooperable holes, such as the studs 25 and holes 25a illustrated in FIGS. 1 and 2. The eyelets 70 constitute a slightly more permanent type of fastening for the members of the sheave, as compared with the screws 24 and 24a. The eyelets 70 can be of plated steel, whereby they have great strength and also resistance to corrosion.

It will now be seen from the foregoing that I have provided a novel and improved multi-part sheave with easily-installed wear strip which is especially resistant to abrasion when the sheave is handling strand material. Surprisingly, the soft rubber nature of the wear strip 46 results in an improved resistance to wear, contrary to what might be expected; normally it is considered that only the harder materials, such as carbides and the like, are capable of serving satisfactory as wear strips, where conditions of abrasion exist. However, I have found that with the special conditions surrounding the handling of wire, where small particles of foreign matter such as dirt and the like are often encountered, the soft nature of the wear strip 46 proves to be an advantage and results in improved wear characteristics and extended useful life.

The improved sheave construction is seen to be economical to produce and assemble, this being also true of the wear strip associated therewith.

Variations and modifications are possible without departing from the spirit of the claims.

I claim:

1. A sheave which is lagged with rubber or rubber-like material, comprising in combination:
    (a) a disc-like member having means at its center, providing a bearing by which the member can be rotatably mounted on a spindle,
    (b) said disc-like member having an annular peripheral portion which is laterally offset axially of the axis of the member,
    (c) a cooperable annular member having a peripheral offset portion which is complementary to the offset portion of the disc-like member,
    (d) means for securing said members together in broadside relation whereby the offset peripheral portions thereof form an annular groove for receiving and guiding a strand of material,
    (e) said members having oppositely-disposed wall portions adjacent their peripheral portions, which together form an annular recess with re-entrant side walls,
    (f) each of said members being characterized by an annular retention groove disposed opposite and coextensive with the retention groove of the other member, the walls of said retention grooves constituting the said re-entrant side walls, and
    (g) a wear strip of relatively soft, resilient material having an elongate rib which is accommodated in and frictionally seized by the re-entrant side walls of said annular recess, said wear strip being characterized by a one-piece cross-sectional configuration and extending along the said recess and presenting an annular exterior space for receiving a strand of material which is being passed around the sheave.

2. A sheave construction as set forth in claim 1, wherein:
    (a) the disc-like member and the cooperable annular member are made of plastic substance.

3. A sheave construction as set forth in claim 1, wherein:
    (a) the wear strip is constituted of soft rubber.

4. A sheave construction as set forth in claim 1, wherein:
    (a) the disc-like member and the cooperable annular member are made of plastic substance, and
    (b) said wear strip being constituted of soft rubber.

5. A sheave construction as set forth in claim 1, and wherein:
    (a) said wear strip has a curvilinear cross section for engagement with the strand of material, and
    (b) said elongate rib is disposed at the center of said curvilinear section and at the convex side thereof.

6. A removable and replaceable wear element for lining the groove of a sheave, comprising in combination:
    (a) an elongate, flexible and resilient strip of soft rubber-like material,
    (b) said strip having a body portion presenting on one side a face for engagement with the strand member being handled by the sheave,
    (c) said strip having an integral elongate rib disposed on the other side of the body portion,
    (d) the rib and body portion of said strip being characterized by a one-piece cross-sectional configuration,
    (e) said rib having re-entrant side walls that converge toward one another at the points of attachment of the rib to the body portion, to a dimension which is less than that of the maximum thickness of the rib, said rib being adapted to receive opposite projecting portions of the sheave so as to lock the wear element in the groove thereof.

7. A removable and replaceable wear element for lining the groove of a sheave, as defined in claim 6, wherein:
    (a) the resilient strip is constituted of soft rubber.

8. A removable and replaceable wear element for lining the groove of a sheave, as defined in claim 6, wherein:
    (a) the elongate rib is disposed centrally along said other side.

9. A removable and replaceable wear element for lining the groove of a sheave, as defined in claim 6, wherein:
    (a) the said face of the resilient strip is concave.

10. A sheave which is lagged with rubber or rubber-like material, comprising in combination:
    (a) a pair disc-like members disposed broadside to one another,
    (b) each of said members having a peripheral offset portion, said offset portions defining an annular groove for receiving and guiding a strand of material,
    (c) said members having oppositely disposed wall portions which together form an annular recess,
    (d) a wear strip of relatively soft, resilient material having an elongate deformable rib which is accommodated in and frictionally seized by the re-entrant side wall of the said recess, said wear strip extending along said annular groove and presenting an exterior space for receiving a strand of material which is being passed around the sheave, (e) adjacent surfaces of said members in the vicinity of the rib being held in spaced-apart relation by the rib,
(f) securing means for fastening the members together and for effecting a pinching of said rib,
(g) said rib being deformed by the pinching action of said members so as to effect a positive retention of the rib and prevent inadvertent dislodgement of the wear strip.

11. The invention as defined in claim 10, wherein:
(a) the rib is generally circular in cross section when formed, and is deformed to a generally egg-shaped configuration when pinched by the members.

12. A sheave construction as set forth in claim 10, wherein:
(a) the disc-like members are formed of plastic substance, and are molded to be essentially identical one to the other.

13. A sheave which is lagged with rubber or rubber-like material, comprising in combination:
(a) a pair of disc-like members disposed broadside to one another,
(b) each of said members being characterized by an annular retention groove disposed opposite to and coextensive with the retention groove of the other member, the walls of said groove constituting re-entrant side walls,
(c) a wear strip of relatively soft, resilient material having an elongate rib which is disposed between the annular retention grooves of the members,
(d) adjacent surfaces of the members in the vicinity of the rib being held in spaced-apart relation by the rib, and
(e) means for securing the members together in said broadside relation,
(f) said means disposed remote from the periphery of the sheave and effecting a bowing inward of both of the members against the action of the rib, so as to effect a tight retention of the rib,
(g) said rib being laterally compressed and deformed by the pinching action of the members.

14. A sheave construction as defined in claim 13, and further including:
(a) means at the central portions of the members, providing a pair of shoulders,
(b) a bearing having inner and outer races,
(c) the outer race being clamped between the shoulders by the said securing means.

15. A sheave construction as defined in claim 14, wherein:
(a) adjacent surfaces of the members in the vicinity of the shoulders are held in spaced-apart relation by the bearing,
(b) said securing means effecting a bowing inward of both of the members against the separating influence of the bearing so as to effect a tight retention of the bearing.

16. A sheave construction as set forth in claim 1, and further including:
(a) cooperable means on said members for orienting them to facilitate assembly during installation of said securing means.

17. A sheave construction as set forth in claim 16, wherein:
(a) said cooperable orienting means comprises a pin on one of said members, and means defining an aperture in the other of said members, in which the pin can be received.

18. A sheave construction as set forth in claim 16, wherein:
(a) said cooperable orienting means comprises a pin on one of said members, and means defining an aperture in the other of said members to receive the pin, and
(b) an additional pin on the other of said members, and means defining an aperture in the first of said members, to receive the additional pin,
(c) said pins being spaced circumferentially from one another.

19. A sheave construction as set forth in claim 1, wherein:
(a) said securing means comprises a hollow boss on one of said members,
(b) means defining an aperture in the other of said members,
(c) an oversize screw carried in the hollow boss,
(d) said boss being constituted of deformable material such that when the screw is installed in the boss, it expands the walls thereof into frictional engagement with the walls of the aperture.

20. The invention as defined in claim 1, wherein:
(a) said securing means effects a bowing inward of both of the members against the action of the rib, so as to effect a tight retention thereof,
(b) said rib being laterally compressed and deformed by the pinching action of the members.

* * * * *